United States Patent [19]

Levin et al.

[11] Patent Number: 4,956,094

[45] Date of Patent: Sep. 11, 1990

[54] ENHANCED PHOSPHATE REMOVAL FROM BOD-CONTAINING WASTEWATER

[75] Inventors: Gilbert V. Levin, Annapolis; Ronald R. Wright, Parkville, both of Md.

[73] Assignee: Biospherics Incorporated, Beltsville, Md.

[21] Appl. No.: 374,137

[22] Filed: Jul. 21, 1989

Related U.S. Application Data

[63] Continuation-in-part of Ser. No. 291,419, Dec. 22, 1988, abandoned, which is a continuation of Ser. No. 169,145, Mar. 10, 1988, abandoned, which is a continuation of Ser. No. 833,110, Feb. 26, 1986, abandoned.

[51] Int. Cl.⁵ .................................................. C02F 3/30
[52] U.S. Cl. .................................... 210/625; 210/630; 210/631; 210/906
[58] Field of Search ............... 210/605, 609, 625, 630, 210/631, 906

[56] References Cited

U.S. PATENT DOCUMENTS 4,042,493  8/1977  Matsch et al. ............................ 210/6
4,141,822  2/1979  Levin et al. ...................... 210/906 X
4,183,808  1/1980  Ornevich ......................... 210/906 X
4,460,470  7/1984  Reimann ......................... 210/906 X
4,488,968 12/1984  Hong et al. ..................... 210/906 X

FOREIGN PATENT DOCUMENTS 59-109295  6/1984  Japan ................................... 210/906

OTHER PUBLICATIONS

"Applying Biotechnology to Clean Up Pollution", Nell Henderson, The Washington Post, Apr. 28, 1986.
"A Parametric Model for Biological Excess Phosphorus Removal", I.A.W.P.R Post Conference Seminar on Phosphate Removal, Pretoria, South Africa, 1982, Siebritz et al.
"The Effect of Aeration Basin Configuration on Activated Sludge Bulking at Low Organic Loading", Water Science and Technology, 14, 407–427, S-E. Lee et al., Capetown, 1982.

Primary Examiner—Tom Wyse
Attorney, Agent, or Firm—Roylance, Abrams, Berdo & Goodman

[57] ABSTRACT

There is disclosed an activated sludge wastewater treatment process which comprises aerating a mixed liquor comprising phosphate-containing influent wastewater and activated sludge in an aeration or high-purity oxygen zone to reduce the BOD/COD content of the wastewater and to cause the microorganisms present to take up phosphate. A phosphate-enriched sludge in which the phosphorus is present primarily in the sludge solids is separated from the mixed liquor to provide a substantially phosphate-free effluent. At least a portion of said phosphate-enriched sludge is passed to a phosphate pre-stripping zone, either in a separate tank or within the phosphate stripper tank itself, where BOD/COD-containing water, or feedwater, containing at least 50 mg/L of BOD, is added to poise the sludge organisms to begin enhanced rapid release of dissolved phosphate by pre-stripping it from the sludge or poising the sludge for rapid, enhanced release of phosphate. Then, the sludge is passed to a phosphate stripping zone. In the phosphate stripping zone, the sludge settles to form a supernatant liquor in the stripping zone upper section and settled sludge in the stripping zone lower section. The settled sludge is maintained under anaerobic conditions for a time sufficient to complete the release of the desired amount of phosphate from the sludge solids to the liquid phase of said settled sludge. At least a portion of the anaerobic sludge from the phosphate stripping zone is recycled to the aeration or high-purity oxygen zone as activatd sludge. The phosphate-rich supernatant from the phosphate stripping zone may be applied directly to land, or treated with a chemical precipitating agent to precipitate the phosphate therefrom and the precipitated phosphate may then be removed through the use of a reactor/clarifier, primary or secondary clarifier or other tankage, thus preparing the phosphate for final disposal directly or as fresh, digested or otherwise treated sludge.

20 Claims, 1 Drawing Sheet

ENHANCED PHOSPHATE REMOVAL FROM BOD-CONTAINING WASTEWATER

CROSS-REFERENCE TO RELATED APPLICATIONS

This application is a continuation-in-part of application Ser. No. 07/291,419, filed Dec. 22, 1988, abandoned; which was a continuation of application Ser. No. 07/169,145, filed Mar. 10, 1988, abandoned; which was a continuation of application Ser. No. 06/833,110, filed Feb. 26, 1986, abandoned.

BACKGROUND OF THE INVENTION

This invention relates to enhanced phosphate removal in an activated sludge sewage or wastewater (used interchangeably herein) treatment process.

Sidestream biological phosphorus removal is any process in which a portion or all of the return activated sludge is separated or concentrated from a phosphate-free, or phosphate-reduced effluent (in a secondary settling zone) with the separated or concentrated sludge maintained anaerobically to induce the organisms contained therein to release internal phosphate to provide a relatively (compared to the influent) concentrated phosphate supernatant. The anaerobic sludge organism mass is then returned to the influent or primary wastewater stream or directly to the aeration basin for mixing with influent wastewater under aerobic conditions which induce the organisms to take up most or all of the influent and process-released phosphate accompanying the return anaerobic sludge. The aeration basin discharges to a settling basin or clarifier and, after settling or separation, the mixed liquor thus treated leaves the supernatant effluent phosphate-free, or nearly so, for discharge into receiving waters or for further treatment. The process can thus avail itself of two "sinks" for ultimate removal of phosphorus from the wastewater: (1) chemical removal by precipitation of the anaerobically released phosphate contained in the supernatant of the anaerobic zone, and (2) removal of phosphate-rich activated sludge through normal sludge wasting. For many applications, the present invention will achieve the desired results using only the second of these sinks, normal sludge wasting.

The sidestream processes, which are described and claimed in U.S. Pat. Nos. 3,236,766; 3,654,146; 3,654,147; 3,681,235; 3,730,882; 3,756,946; 4,042,493; 4,141,822; 4,175,041; and 4,183,808, the disclosures of which are incorporated herein by reference, have gained widespread acceptance as an efficacious means for removing phosphorus from municipal wastewater economically to produce final effluents containing only 1.0 mg/L, or less, total phosphorus. Previous methods relied upon the more costly and more sludge productive chemical precipitation of phosphate from the entire wastewater flow.

The active agent in all biological phosphorus removal processes is the microorganism constituent of the activated sludge. It is these sludge organisms which must be cycled through aerobic and anaerobic treatment to induce the phosphate uptake and release activities essential for the processes. Applying anaerobic treatment to the activated sludge only, in whole or in part, constitutes a major advantage for the sidestream processes over the fullstream processes since less tank volume is required to retain the microorganisms under anaerobic conditions in the sidestream processes than to retain the same mass of microorganisms under anaerobic conditions for the same time period in the fullstream processes.

Siebritz et al, "A Parametric Model for Biological Excess Phosphorus Removal", presented at the I. A. W. P. R. Post Conference Seminar on Phosphate Removal, Pretoria, South Africa (1982) and Ekama et al, "Considerations in the Process Design of Nutrient Removal Activated Sludge Processes", Department of Civil Engineering, University of Capetown, Rondebosch, 7700, South Africa (1982), report on rates of release of phosphate from anaerobic microorganisms. They report that when additional dissolved organic matter is added to anaerobic wastewater microorganisms in fullstream processes, substantial quantities of phosphate are released by the organisms more rapidly than when no such organic matter is added. The added organic matter can be in the form of BOD/COD-containing wastewater.

U.S. Pat. No. 4,042,493 to Matsch et al discloses a sidestream phosphate removal process in which primary effluent is used to elutriate the phosphate secreted in the bottom of the phosphate stripper tank. The phosphate is thus conveyed to the supernatant level and flows over the effluent launder to the stripper tank. In this process, the anaerobic retention period applied to the sludge in the stripper tank is typically 10–16 hours. The primary effluent is introduced into the bottom of the stripper to effect a counter-current elutriation. Hence, initial contact of the BOD/COD-containing primary effluent is with the portion of the stripper tank sludge at the bottom of the tank. This sludge has already been held under anaerobic conditions for the stated 10–16 hour retention period. Even if the sludge content of the stripper tank were uniformly mixed, the average retention time of the organisms contacting the organic matter introduced with the primary effluent would already be half of the anaerobic retention period. This constitutes a period during which much of the releasable phosphate would have been secreted by the sludge organisms. In addition, the primary effluent is rapidly dispersed throughout the tank volume, quickly diluting the effective BOD/COD level to which the sludge organisms are exposed. Because of these factors, no significant additional phosphate is released when these organisms are contacted by the primary effluent. Thus, the effect of adding BOD/COD-containing wastewater on the ability of the organisms to release phosphate rapidly is small, or absent, in the process of Matsch et al.

S-E. Lee et al, "The Effects of Aeration Basin Configuration on Activated Sludge Bulking at Low Organic Loading", *Water Science and Technology*, 14, 407–427, Capetown, 1982, report on a variation on the activated sludge process in which return activated sludge is mixed with primary effluent in a small compartment, called a "cell selector", just before being passed to the aeration basin. The purpose of this procedure is to minimize the presence of foam-producing organisms which are a frequent problem in activated sludge plants. It accomplishes this by imposing a high initial BOD/COD-to-microorganism ratio by introducing primary effluent to the microorganisms while the former is still untreated. The Lee et al innovation has no direct bearing upon the phosphorus removal process, but provides for increasing the effective concentration of BOD/COD "seen" by the microorganisms in the activated sludge process.

SUMMARY OF THE INVENTION

In accordance with this invention, there is provided an activated sludge wastewater treatment process which comprises aerating a mixed liquor constituted of phosphate-containing influent wastewater material and activated sludge in an aeration or high-purity oxygen zone to reduce the BOD/COD content of the wastewater and to cause the microorganisms present to take up phosphate. A phosphate-enriched sludge in which the phosphate is present in the sludge solids is separated from the mixed liquor to provide a substantially phosphate-free effluent. At least a portion of said phosphate-enriched sludge is passed to a phosphate pre-stripping zone, either in a separate tank or within the phosphate stripper tank itself. In, or immediately upstream from this pre-stripping zone, BOD/COD-containing wastewater, or feedwater, containing at least 50 mg/L of BOD, is added and allowed to mix or is mixed with the sludge to cause enhanced rapid release of phosphate by pre-stripping, or poising for stripping, it from the sludge as the result of its contact with and adsorption/absorption of the BOD/COD organic water. Thence, the sludge is passed to a phosphate stripping zone.

In systems where a high degree of phosphorus removal is desired, resulting in effluents containing total phosphorus of 1.0 mg/L or less, the sludge settles to form a supernatant liquor in the stripping zone upper section and settled sludge in the stripping zone lower section. The settled sludge is maintained under anaerobic conditions to release phosphate, or additional phosphate, from the sludge solids to the liquid phase of said settled sludge. The phosphate released by the settled anaerobic sludge is distributed to maximize or optimize phosphate content in the supernatant of the stripping zone by sludge recycled from the bottom to the top of the tank, by counter-current elutriation with primary effluent or other streams, or by other means. At least a portion of the anaerobic sludge from the phosphate stripping zone is recycled to the aeration or high-purity oxygen zone. The phosphate-rich supernatant from the phosphate stripping zone may be applied directly to land, or treated with a chemical precipitating agent to precipitate the phosphate therefrom and the precipitated phosphorus may then be removed through the use of a reactor/clarifier, primary or secondary clarifier or other tankage, thus preparing the phosphate for final disposal directly or as fresh, digested or otherwise treated sludge.

The present invention permits effluent total phosphorus concentrations of 2.0 mg/L to be achieved without the need for settling the stripper contents, withdrawing a supernatant from the stripper, or adding any chemical precipitant to the process. This is accomplished through the greater phosphate uptake capacity induced in the activated sludge organisms by the enhanced release phenomenon. Thus, normal wasting of activated sludge removes sufficient phosphorus from the system to accomplish the desired results. The phosphate released in the stripping zone is virtually completely reassimilated by the organisms in the aeration basin along with the freshly incoming phosphate.

The essence of this invention is the mixing of fresh, or nearly fresh, return activated sludge with BOD/COD-containing wastewater containing at least 50 mg/L of BOD, which would come from phosphate stripper sludge underflow, primary sludge, thickened sludge, or primarily liquid streams such as sludge centrate, effluent from sludge oxidation processes, digester supernatant, etc., in a manner maximizing or optimizing the concentration of BOD/COD to which the return activated sludge microorganisms are first exposed upon discharge from the secondary clarifier. This renders the BOD/COD-containing wastewater highly effective in reducing the time otherwise necessary for the anaerobic sludge organisms to release a given quantity of phosphate. Thus, the total tankage of the enhanced released pre-stripper tank and the stripper tank will be significantly less than that of the stripper tank alone required by the previous versions of the sidestream process which, in turn, require significantly less tankage than do the fullstream processes for biological phosphorus removal. Since raw wastewater, or primary effluent, prior to BOD/COD reduction is added to only a portion of the return sludge, rather than to the entire return sludge stream as in the method of Siebritz et al, supra, and all other fullstream methods, the resulting concentration of BOD/COD is greater. Further, only a portion of the raw wastewater or primary effluent is added to a portion of the settled return sludge in the herein described invention, as opposed to the addition of the entire flow of raw wastewater or primary effluent to the entire mixed liquor flow as required in the met' od of Siebritz et al and all other fullstream methods. The tankage required by the enhanced release phosphate removal method is thereby significantly reduced.

This invention provides for improved biological phosphate removal through maximizing the concentration of available biochemical (or chemical) oxygen demanding matter (BOD/COD) provided to activated sludge through use of a pre-stripper tank to enhance phosphate release. The invention applies to all activated sludge wastewater treatment processes that provide biological removal of phosphorus through anaerobic conditioning of sludge—the "sidestream" methods—as opposed to those processes which provide biological removal of phosphorus through anaerobic conditioning of the entire, or nearly entire, wastewater flow—the "fullstream" processes. Furthermore, this invention improves the efficiency of the sidestream biological phosphorus removal process to the point where no supernatant stream need be recovered from the phosphate stripper tank, nor any chemical precipitant added, to achieve final plant effluents containing as little as 2.0 mg/L total phosphorus. The addition of chemical precipitant to stripper tank supernatant will achieve final effluent total phosphorus concentrations of 1.0 mg/L or less.

DETAILED DESCRIPTION OF THE INVENTION

Figure 1:
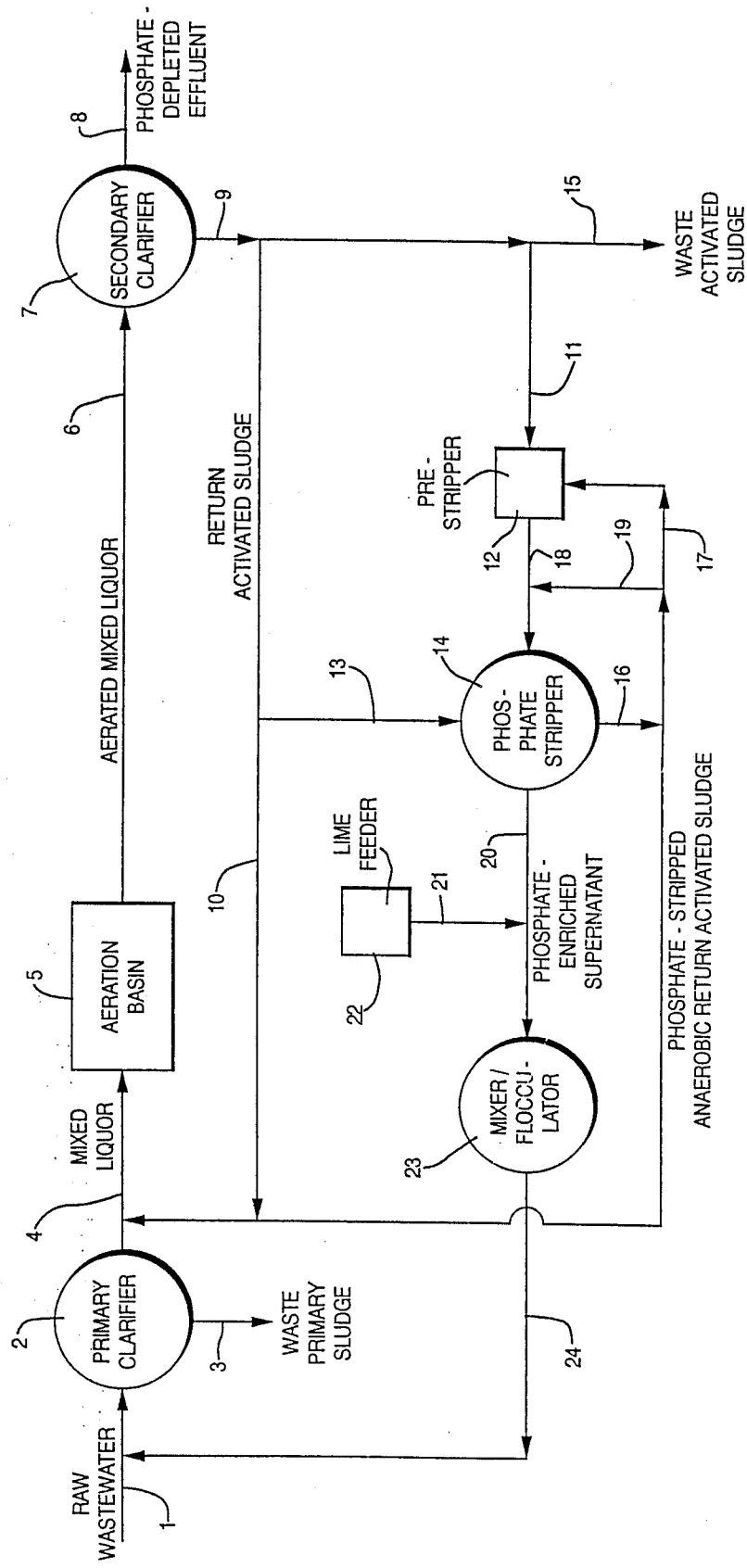
FIG. 1 is a schematic flowsheet of an activated sludge process incorporating the preferred embodiment for the practice of this invention.

Referring to FIG. 1, a phosphate-containing raw wastewater influent stream 1, after passing through conventional screening and grit-removing units, is optionally subjected to primary settling in primary clarifier 2 from which settled waste primary sludge is removed through line 3. The primary clarifier effluent is mixed with return activated sludge 10, and anaerobic return activated sludge 16, to form a mixed liquor in line 4 through which it passes to aeration basin 5. Alternatively, the primary clarifier effluent (or the influent wastewater if no primary clarifier is used), the direct return activated sludge, and the anaerobic return activated sludge may be added individually or in any combination to, or in, the aeration basin to form the mixed liquor.

In the aeration basin, the mixed liquor is aerated at a rate sufficient to maintain an aerobic environment, i.e., so that there is a measurable amount, preferably more than 0.1 mg/L, of dissolved oxygen present in the mixed liquor in at least a part of the aeration basin for a period of 1–8 hours. During aeration, the microorganisms present take up phosphate and consume organic matter present in the wastewater. High degrees of phosphate removal and BOD removal are obtained during the aeration period.

After flowing through the aeration basin, the aerated mixed liquor is discharged through line 6 into secondary clarifier 7. There, the phosphate-enriched organisms settle to form a sludge separate from the liquor. The sludge contains a substantial portion of the phosphate present in the wastewater. The substantially phosphate-free secondary clarifier supernatant is discharged as plant effluent for disposal in a conventional manner by line 8. Alternatively, the plant effluent may be subjected to further treatment steps to meet other effluent standards.

The phosphate-enriched sludge is removed from the secondary clarifier through line 9 and is divided into four streams: (10) return activated sludge routed directly to the aeration basin, (11) return activated sludge routed to the enhanced release pre-stripper (12, 13) return activated sludge routed to the phosphate stripper 14, and 15) waste activated sludge. In the enhanced release pre-stripper, the return activated sludge is mixed with underflow from the phosphate stripper containing at least 50 mg/L of BOD supplied through lines 16 and 17. The finding that the stripper underflow may be rich in BOD/COD capable of promoting enhanced release of phosphate from secondary sludge microorganisms constitutes a principle of this invention. The enhanced release pre-stripper is sized such that the retention period imposed on the mixture of sludge from the secondary clarifier and anaerobic return activated sludge allows adsorption/absorption of the BOD/COD contained in the latter by the sludge microorganisms in the former, in typically between approximately 10 minutes and 30 minutes, during which period phosphate release from the phosphate-rich secondary clarifier sludge organisms is begun or mobilized. The mixture then flows to the phosphate stripper through line 18. In the phosphate stripper, the sludge is settled, leaving clarified supernatant liquor in the upper section. The settled sludge is maintained under anaerobic, i.e., non-aerobic, conditions for a time sufficient to cause the microorganisms in the sludge to continue phosphate release to the degree desired into the liquid phase within the interstices of the anaerobic settled sludge.

The stripper anaerobic sludge containing released phosphate in the liquid phase thereof is treated to transfer the soluble phosphate to enrich the upper section of the stripper. This is accomplished through sludge recycle", as described in U.S. Pat. No. 4,141,822, through lines 16, 19, and 18; and also through lines 16, 17, the pre-stripper, and line 18.

In this manner, a phosphate-enriched supernatant liquor is produced in the phosphate stripper. This supernatant is passed through line 20 where it is dosed with a lime slurry applied through line 21 from lime feeder 22. The mixture enters mixer/flocculator 23 where insoluble phosphate forms. Effluent from the mixer/flocculator is discharged through line 24 to meet influent raw wastewater entering the primary clarifier in which the precipitated phosphate settles for removal, treatment and disposal with the waste primary sludge.

Pre-stripper and Stripper

The pre-stripper may be a separate tank or it may be fitted into the phosphate stripper to minimize space requirements.

A conventional stripper tank may be used or a stripping zone may be used instead. The zone need only be consistent with the sidestream concept, that is, the application of anaerobic conditions be made to the activated sludge only and not to the entire, fullstream, flow of mixed liquor. A stripping zone may be established, for example, in the secondary clarifier. Normally, in the activated sludge process, secondary sludge is pumped from the secondary clarifier such that only one or two feet of sludge depth is maintained in the clarifier. This is to keep the sludge fresh as is desired in activated sludge treatment where phosphate removal is not practiced. However, a deeper sludge blanket may be maintained in the secondary clarifier with sufficient anaerobic retention to cause phosphate release. A submerged weir in the clarifier can remove the phosphate enriched layer just above the sludge without disturbing the functioning of the clarifier in producing its secondary effluent through the surface weir. In the case where no stripper supernatant would be required, where the total phosphorus effluent standard is 2.0 mg/L or more, the submerged weir is not required. Where the stripping zone is within the secondary clarifier, the pre-stripper may be a small tank immersed in the clarifier. A portion of the freshly settling activated sludge may be routed to it through a conical, partial, false bottom and the BOD/COD-enriched stream introduced into the pre-stripper through a pipe. The effluent of the pre-stripper and the secondary clarifier underflow can be maintained separately.

Variations

Variations of this invention are obvious and include, but are not limited to those described herein. As previously indicated, the enhanced release pre-stripper is preferably sized such that the retention period imposed on the mixture of return activated sludge and the BOD/COD-rich stream is between approximately 10 and 30 minutes, based on the time required to poise the sludge to the point of releasing phosphorus. The mixture may be stirred or mixing can be accomplished passively, e.g., by providing baffles or flow guides in the pre-stripper. It is preferred that the BOD/COD-containing stream add at least the equivalent of 20 mg/L of BOD based on the mixture.

Sources of Added BOD/COD

The preferred embodiment of this invention utilizes stripper tank underflow as the medium added to the pre-stripper tank to mix with the activated sludge discharged from the secondary clarifier into the pre-stripper tank. In the course of developing this invention, measurements were taken of the BOD content of stripper underflow. At the full-scale phosphate removal system plant studied, the dissolved 5-day BOD content of the stripper underflow ranged from 281 to 411 mg/L, averaging 349 mg/L. This exceeds that of primary effluent from typical municipal plants by a factor of three to four. Thus, less of this material has to be supplied to the pre-stripper tank to achieve a desired level of added 5-day BOD, the minimum effective added value of which was found to be 20 mg/L as determined experimentally, based on the addition of glucose. However, use of stripper tank underflow confers yet another advantage on this preferred embodiment. The sludge returned to the pre-stripper tank, because of its high soluble phosphate content, also supplies a portion, or all, of the sludge recycle volume needed to distribute the dissolved phosphate to the stripper tank supernatant when the recycle method is used. This practice will eliminate any need to enlarge the pre-stripper tank and the stripper tank to accommodate the added volume of any other stream used as the source of added BOD/COD. Thus, in this preferred embodiment, the volume of tankage and the pumping energy required are minimized and, accordingly, the construction and operation are at maximum economy.

An alternate, or supplemental, innovative source of BOD/COD-rich water for the pre-stripper tank was found to be primary sludge. The plant studied in the development of this invention produced primary sludge with a dissolved 5-day BOD ranging from 58 to 549 mg/L and averaging 313 mg/L. A number of activated sludge plants forego primary settling and, after screening and degritting, discharge the raw wastewater directly into the aeration basin (thereby demonstrating that primary sludge materials are not harmful to the activated sludge process). Hence, the use of sludge removed from the underflow of primary settling tanks, which exist in most plants, will be satisfactory. At the plant studied, primary sludge was being used as elutriant in the phosphate stripper tank with no difficulty. However, no pre-stripper tank was in use, and the advantage of the present invention did not operate.

Any other sources of BOD/COD-rich water can be used singly or in combination to mix with return activated sludge in the pre-stripper tank. Sources include, but are not limited to, primary effluent, sludge thickener overflow or underflow, pressure or vacuum sludge filtrate, digester supernatant, sludge centrate, and Zimpro-type sludge processing digest. The last source contains dissolved 5-day BOD at levels of approximately 3000 mg/L. While some of these sources may not be adequate in quantity, they can be used in combination to achieve the desired quantity of flow at maximum available average BOD/COD. pg,

Advantages of the Invention

The principal advantage of this invention over the standard sidestream phosphorus removal process is significant reduction in the size of the stripper tank by virtue of the rapid release of phosphate obtained through use of the pre-stripper tank. The required stripper sludge volume may be reduced by 50% and the total stripper tankage may thus be reduced in volume by 30-50%. This represents a major cost reduction in the capital investment for the process. The stripper tank, heretofore, has been the most expensive element in the sidestream phosphorus removal process. Not only will the size of the tank be reduced, but also the internal mechanisms and related equipment will be reduced. These downsizings will result in significantly reduced maintenance and repair costs. The pumping requirements will also be reduced with concomitant savings in capital and operating costs.

To illustrate the reduction in stripper volume achieved by the preferred embodiment (use of stripper underflow as pre-stripper BOD/COD source) of this invention over a conventional sidestream phosphorus removal process (using stripper underflow recycle), stripper volumes for both processes were calculated using the following design criteria:

| Criteria | Conventional Sidestream Phosphorus Removal with Stripper Recycle | This Invention with Stripper Underflow as BOD Source |
| --- | --- | --- |
| a. Anaerobic retention period | 8 hours | 4 hours |
| b. Return sludge as a percent of primary effluent flow | 40% | 40% |
| c. Percent of return sludge routed to stripper | 40% | 40% |
| d. Stripper concentration factor | 2 | 2 |
| e. Blanket density factor | 0.8 | 0.8 |
| f. Stripper tank freeboard | 2 feet | 2 feet |
| g. Depth of stripper supernatant | 4 feet | 4 feet |
| h. Stripper tank diameter | 50 feet | 50 feet |

Total stripper volume is calculated by determining the required volume of sludge to achieve the design anaerobic retention period (criterion a), selecting an appropriate tank diameter (criterion h) and adding depth for supernatant (criterion g) and freeboard (criterion f). Neither conventional sludge recycle nor the use of stripper underflow in the pre-stripper tank of this invention affects the size of the pre-stripper tank. The volume required to achieve the desired anaerobic retention period is determined by first calculating the flow of return sludge from the stripper (primary effluent flow times criterion b, times criterion c, divided by criterion d), dividing this flow into the desired anaerobic retention period (time divided by flow gives volume); this volume is then divided by criterion e, the blanket density factor, to adjust for the average blanket density as compared to the density of the stripper underflow sludge. The stripper concentration factor (criterion d) is a measure of the exiting sludge concentration as compared to the return sludge routed to the stripper. A factor of 2 means that the exiting sludge is twice as concentrated as the return sludge, so the sludge flow rate out of the stripper will be one-half the return sludge flow rate into the stripper The effect of the invention on stripper tank size is given below.

| Primary Effluent or Wastewater Flow (000 gal./day) | Total Stripper Volumes (000 gal.) | | Percent Reduction |
|---|---|---|---|
| | Conventional Sidestream Phosphorus Removal with Stripper Recycle | This Invention with Stripper Underflow as BOD Source | |
| 2,000 | 380 | 250 | 34% |
| 5,000 | 780 | 450 | 43% |
| 10,000 | 1450 | 780 | 46% |

The following specific example illustrates this invention:

EXAMPLE

Raw wastewater averaging 10 million gallons per day (mgd) and chemically treated supernatant from a chemical mixing tank, averaging 0.75 mgd, are passed to a primary settling tank from which primary effluent and primary sludge are removed. The primary effluent is mixed with approximately 3.15 mgd of recycled activated sludge from the secondary clarifier and stripper tank. The mixed liquor thus formed is then fed at the rate of 13.90 million gallons per day to an aeration zone and it is aerated at a rate that is adequate to maintain dissolved oxygen levels greater than about 0.2 mg/L for four to six hours. The effluent mixed liquor from the aeration zone is fed into a secondary settling tank. Clarified waste liquid which is substantially free of phosphate is discharged as effluent. The phosphate-enriched activated sludge underflow from the secondary clarifier sludge is divided into three streams. One stream of approximately 2.4 mgd is recycled for mixing with influent sewage prior to introduction into the aeration tank; one portion of approximately 0.1 mgd is removed from the system as waste sludge; and one portion of approximately 1.5 mgd, comprising the remainder of the total amount of sludge removed from the secondary settling tank, is passed to a phosphate pre-stripper wherein it is mixed with underflow from the phosphate stripper tank in an amount of about one gallon of stripper sludge per three gallons of phosphate-enriched sludge. The mixture is maintained under anaerobic conditions in the pre-stripper for about 15-20 minutes to induce immediate and enhanced phosphate release. The mixture is then passed to the phosphate stripping tank wherein it is maintained under anaerobic conditions for about another four to eight hours, during which time the microorganisms release the amount of phosphate desired for the process. There is thus formed in the phosphate stripper a phosphate-enriched liquid and a phosphate-depleted sludge. A portion of the anaerobic sludge containing released phosphate in the liquid phase thereof is withdrawn at a rate of about 1.5 mgd from the bottom of the phosphate stripping zone, approximately 0.75 mgd thereof is recycled within the stripping zone to distribute the dissolved phosphate to the supernatant, a portion of the stripper recycle in the ratio indicated above is fed to the pre-stripper; and the remainder of the stripper underflow is returned to mix with incoming wastewater in the aeration tank to complete the mixed liquor. The phosphate-enriched supernatant liquid is withdrawn from the high-phosphate stripping zone and is fed into a chemical mixing tank where lime is added to form a phosphate precipitate which is then passed into the primary settling tank for settling and removal with the primary sludge. The process removes about 95% of the phosphate contained in the influent wastewater.

Fullstream biological phosphorus removal processes also admix primary effluent with return sludge. However, in such processes, the primary effluent is mixed with the entire flow of return sludge which flow generally equals or exceeds the primary effluent flow itself. In all such processes operating on normal domestic wastewater, the BOD/COD content introduced with the primary effluent is quickly reduced below the threshold level required for enhanced release of phosphate and the effect provided by the subject invention does not occur in such processes. Advantages claimed as unique for this invention include:

1. Phosphorus-rich sludge organisms can be controllably exposed to higher BOD/COD concentrations from anaerobic sludge recycle, primary sludge, or other BOD/COD-rich process streams, or primary effluent used for elutriation in a manner optimally using the available BOD/COD to effect and maximize enhanced release of phosphate from the sludge organisms.
2. The metabolism, or biodegradation, of the high BOD/COD content stream used to promote enhanced release improves overall plant removal of BOD/COD.
3. The use of BOD/COD-rich stripper tank sludge underflow as the sole BOD/COD source for enhanced release, where practicable, provides higher BOD concentrations than available in other biological phosphorus removal processes, and does not dilute this BOD/COD-rich source with any other streams nor add to the volume treated, and therefore, the sizes in the pre-stripper and stripper.

What is claimed is:

1. An activated sludge wastewater treatment process which comprises aerating a mixed liquor of phosphate-containing influent wastewater and activated sludge in an aeration or high-purity oxygen zone to reduce the BOD/COD content of said wastewater and to cause the microorganisms present to take up phosphate; separating a phosphate-enriched sludge, in which the phosphate is present in the sludge solids, from the mixed liquor to provide a substantially phosphate-free effluent; passing at least a portion of said phosphate-enriched sludge to a phosphate pre-stripping zone where BOD/COD-containing water containing at least 50 mg/L of BOD is added to poise the sludge organisms to begin enhanced release of phosphate; and thence passing said sludge to a phosphate stripping zone and settling, or partially settling, said sludge to form supernatant liquor; maintaining said settled, or partially settled, sludge under anaerobic conditions for a time sufficient to complete the release of the desired amount of phosphate from the sludge solids to the liquid phase; contacting at least a portion of the anaerobic sludge, which contains released phosphate in the liquid phase thereof in said phosphate stripping zone, with a lower soluble phosphate content aqueous medium to transfer the soluble phosphate in the anaerobic sludge liquid phase to said lower soluble phosphate content aqueous medium for conveying phosphate into the supernatant liquor, thereby enriching said stripping zone upper section; and recycling at least a portion of said anaerobic sludge from said phosphate stripping zone to said aeration or high-purity oxygen zone as said activated sludge.

2. A process as defined in claim 1 wherein said phosphate pre-stripping zone is located in a separate tank from said phosphate stripping zone.

3. A process as defined in claim 1 wherein said phosphate pre-stripping zone is located within said phosphate stripping zone.

4. A process as defined in claim 1, wherein the residence times of the sludge in said phosphate pre-stripping zone is sufficient to allow the sludge microorganisms to absorb substantially all of the BOD/COD.

5. A process as defined in claim 1 wherein a portion of the sludge passing from the phosphate pre-stripping zone is returned to the influent end of the pre-stripping zone.

6. A process as defined in claim 1 wherein the contents of said phosphate stripping zone are continuously or intermittently agitated to cause the anaerobic sludge containing the soluble phosphate to mix with the supernatant liquor, thereafter permitting said sludge solids to settle, whereby the soluble phosphate content of said anaerobic sludge is transferred to the supernatant liquor in said phosphate stripping zone.

7. A process as defined in claim 1 wherein a portion of the supernatant liquor in said phosphate stripping zone is withdrawn therefrom and is reintroduced into said phosphate stripping zone underneath said anaerobic sludge containing released phosphate, whereby a counter-current elutriation of the soluble phosphate in said settled or expanded or fluidized bed of anaerobic sludge is established.

8. A process as defined in claim 1 wherein at least a portion of said phosphate-enriched sludge which is passed to said phosphate stripping zone is introduced into said phosphate stripping zone beneath said anaerobic sludge containing released phosphate, whereby a counter-current elutriation of the soluble phosphate in said anaerobic sludge is established.

9. A process as defined in claim 1 wherein the contents of said phosphate stripping zone are intermittently agitated by the introduction of a non-oxygen containing gas underneath the anaerobic sludge containing released phosphate.

10. A process as defined in claim 1 wherein a portion of said anaerobic sludge containing released phosphate in the liquid phase thereof is raised into said supernatant liquor in said stripping zone and is then permitted to resettle, so that released phosphate in the liquid phase of said raised anaerobic sludge is eluted by said supernatant liquor during said resettling.

11. A process as defined in claim 1 wherein anaerobic sludge containing released phosphate in the liquid phase thereof is withdrawn from said phosphate stripping zone and reintroduced into said supernatant liquor in said stripping zone for transfer of the released phosphate from the liquid phase of the reintroduced anaerobic sludge to said supernatant liquor for said phosphate enrichment thereof.

12. A process as defined in claim 1 wherein phosphate-enriched supernatant liquor is treated with a phosphate precipitant to precipitate phosphate or, in lieu thereof, said supernatant is applied to land.

13. A process as defined in claim 1 in which flow to any or all unit operations may be fixed, continuous, variable continuous, fixed intermittent or variable intermittent.

14. An activated sludge sewage treatment process which comprises aerating a mixed liquor comprising phosphate-containing influent sewage material and activated sludge in an aeration or high-purity oxygen zone to reduce the BOD/COD content of said sewage material and to cause the microorganisms present to take up phosphate; separating a phosphate-enriched sludge, in which the phosphate is present in the sludge solids, from the mixed liquor to provide a substantially phosphate-free effluent; passing at least a portion of said phosphate-enriched sludge to a phosphate pre-stripping zone where BOD/COD-containing wastewater, or feedwater, containing at least 50 mg/L of BOD, is added to poise the sludge organisms to begin enhanced release of phosphate; and thence passing said sludge to a phosphate stripping zone and settling said sludge to form supernatant liquor in said stripping zone upper section and settled sludge; maintaining said settled sludge under anaerobic conditions for a time sufficient to complete the release of the desired amount of phosphate from the sludge solids to the liquid phase of said settled sludge; contacting the anaerobic sludge containing released phosphate in the liquid phase thereof with the sludge being passed from the phosphate pre-stripping zone to said phosphate stripping zone to transfer the soluble phosphate in the liquid phase of said anaerobic sludge to the liquid phase of said sludge being passed from the phosphate pre-stripping zone for phosphate enrichment of supernatant liquor in said stripping zone upper section; and returning at least a portion of said anaerobic sludge from said phosphate stripping zone to said aeration or high-purity oxygen zone as said activated sludge.

15. A process as defined in claim 14 wherein the residence time of the sludge in said phosphate pre-stripping zone is sufficient to allow the sludge microorganisms to absorb substantially all of the BOD/COD.

16. A process as defined in claim 14 wherein a portion of the anaerobic sludge containing released phosphate is withdrawn from said stripping zone and mixed with sludge passing from the pre-stripping zone; and said mixed sludge is then passed to said phosphate stripping zone.

17. A process as defined in claim 14 wherein a portion of the sludge passing from said phosphate pre-stripping zone is withdrawn therefrom and is reintroduced into said phosphate stripping zone underneath said anaerobic sludge containing released phosphate, whereby a counter-current elutriation of the soluble phosphate in said anaerobic sludge is established.

18. A process as defined in claim 14 in which flow to any or all unit operations may be fixed, continuous, variable continuous, fixed intermittent or variable intermittent.

19. An activated sludge sewage treatment process which comprises aerating a mixed liquor comprising phosphate-containing influent sewage material and activated sludge in an aeration or high-purity oxygen zone to reduce the BOD/COD content of said sewage material and to cause the microorganisms present to take up phosphate; separating a phosphate-enriched sludge, in which the phosphate is present in the sludge solids, from the mixed liquor to provide a substantially phosphate-free effluent; passing at least a portion of said phosphate-enriched sludge to a phosphate pre-stripping zone where BOD/COD-containing wastewater, or feedwater, containing at least 50 mg/L of BOD, is added to poise the sludge organisms to begin enhanced release of phosphate by pre-stripping it from the sludge; and thence passing said sludge to a phosphate stripping zone and settling said sludge to form supernatant liquor in said stripping zone upper section and settled sludge; maintaining said settled sludge under anaerobic conditions for a time sufficient to complete the release of the desired amount of phosphate from the sludge solids to the liquid phase of said settled sludge; contacting the anaerobic sludge containing released phosphate in the liquid phase thereof with supernatant liquor formed in said stripping zone upper section to transfer the soluble phosphate in the anaerobic settled sludge liquid phase to said supernatant liquor for phosphate enrichment of supernatant liquor in said stripping zone upper section; and recycling at least a portion of said anaerobic sludge from said phosphate stripping zone to said aeration or high-purity oxygen zone as said activated sludge.

20. A process as defined in claim 19 in which flow to any or all unit operations may be fixed. continuous, variable continuous, fixed intermittent or variable intermittent.

* * * * *